(12) United States Patent
Nagase (10) Patent No.: US 8,099,414 B2
(45) Date of Patent: Jan. 17, 2012

(54) FACILITY INFORMATION OUTPUT DEVICE, FACILITY INFORMATION OUTPUT METHOD, AND COMPUTER-READABLE MEDIUM STORING FACILITY INFORMATION OUTPUT PROGRAM

(75) Inventor: Kenji Nagase, Aichi (JP)

(73) Assignee: Aisin Aw Co., Ltd., Aichi (JP)

( * ) Notice: Subject to any disclaimer, the term of this patent is extended or adjusted under 35 U.S.C. 154(b) by 482 days.

(21) Appl. No.: 12/277,532

(22) Filed: Nov. 25, 2008

(65) Prior Publication Data

US 2009/0144268 A1 Jun. 4, 2009

(30) Foreign Application Priority Data

Nov. 30, 2007 (JP) ................. 2007-310380

(51) Int. Cl.
*G06F 7/00* (2006.01)
*G06F 17/30* (2006.01)
*G06F 15/16* (2006.01)

(52) U.S. Cl. .............. 707/724; 707/920; 707/921

(58) Field of Classification Search .......... 707/724, 707/921, 920
See application file for complete search history.

(56) References Cited

U.S. PATENT DOCUMENTS

| 6,430,547 B1 * | 8/2002 | Busche et al. ............... 707/921 |
| 2001/0051947 A1 * | 12/2001 | Morimoto et al. ........... 707/100 |
| 2002/0065602 A1 | 5/2002 | Ohshima |
| 2004/0080510 A1 | 4/2004 | Inokuchi et al. |
| 2005/0137788 A1 | 6/2005 | Kimura |
| 2005/0210021 A1 | 9/2005 | Miyazaki et al. |
| 2006/0026170 A1 * | 2/2006 | Kreitler et al. ................. 707/10 |
| 2006/0085387 A1 * | 4/2006 | Aggarwal et al. .............. 707/2 |
| 2007/0198495 A1 * | 8/2007 | Buron et al. .................... 707/3 |
| 2007/0219714 A1 | 9/2007 | Uchida et al. |

FOREIGN PATENT DOCUMENTS

| EP | 1061712 A1 | 12/2000 |
| JP | 2006-194817 A | 7/2006 |

OTHER PUBLICATIONS

EP Search Report for EP 08 16 9129 dated Feb. 18, 2009.

* cited by examiner

*Primary Examiner* — Greta Robinson
*Assistant Examiner* — Brian E. Weinrich
(74) *Attorney, Agent, or Firm* — Lowe Hauptman Ham & Berner LLP (57) ABSTRACT

Facility information for a destination facility and facility information for a neighboring facility of the destination facility are accepted as search conditions. The destination facility that neighbors the neighboring facility is identified by using a database that defines a neighboring relationship between the facilities. The facility information for the identified destination facility is outputted.

7 Claims, 6 Drawing Sheets

| FACILITY ID | FACILITY NAME | NEIGHBORING FACILITY | FACILITY ON THE RIGHT | FACILITY ON THE LEFT |
|---|---|---|---|---|
| 1 | I-RO-HA STORE | YES | 3 | 11 |
| 2 | I-RO-HA DEPARTMENT STORE | YES | 9 | 25 |
| 3 | HO-HE-TO BOOKSTORE | YES | 10 | 1 |
| . | . | . | . | . |
| . | . | . | . | . |
| . | . | . | . | . |
| 7 | CHI-RI-NU BOOKSTORE | NO | ---- | ---- |
| 8 | I-RO-HA STORE | NO | ---- | ---- |
| 9 | WA-KA-YO STATIONERY | YES | ---- | 10 |
| 10 | NO-O-KU RECORDS | YES | 9 | 3 |
| 11 | CHI-RI-NU LIQUOR STORE | YES | 1 | ---- |
| . | . | . | . | . |
| . | . | . | . | . |
| . | . | . | . | . |

| FACILITY ID | FACILITY NAME | NEIGHBORING FACILITY | FACILITY ON THE RIGHT | FACILITY ON THE LEFT |
|---|---|---|---|---|
| 1 | I-RO-HA STORE | YES | 3 | 11 |
| 2 | I-RO-HA DEPARTMENT STORE | YES | 9 | 25 |
| 3 | HO-HE-TO BOOKSTORE | YES | 10 | 1 |
| . | . | . | . | . |
| . | . | . | . | . |
| . | . | . | . | . |
| 7 | CHI-RI-NU BOOKSTORE | NO | --- | --- |
| 8 | I-RO-HA STORE | NO | --- | --- |
| 9 | WA-KA-YO STATIONERY | YES | --- | 10 |
| 10 | NO-O-KU RECORDS | YES | 9 | 3 |
| 11 | CHI-RI-NU LIQUOR STORE | YES | 1 | --- |
| . | . | . | . | . |
| . | . | . | . | . |
| . | . | . | . | . |

FIG. 8

| FACILITY ID | FACILITY NAME | COORDINATES |
|---|---|---|
| 1 | I-RO-HA STORE | X1,Y1 |
| 2 | I-RO-HA DEPARTMENT STORE | X2,Y2 |
| 3 | HO-HE-TO BOOKSTORE | X3,Y3 |
| . | . | . |
| . | . | . |
| . | . | . |
| 7 | CHI-RI-NU BOOKSTORE | X7,Y7 |
| 8 | I-RO-HA STORE | X8,Y8 |
| 9 | WA-KA-YO STATIONERY | X9,Y9 |
| 10 | NO-O-KU RECORDS | X10,Y10 |
| 11 | CHI-RI-NU LIQUOR STORE | X11,Y11 |
| . | . | . |
| . | . | . |
| . | . | . |

FIG. 9

FACILITY INFORMATION OUTPUT DEVICE, FACILITY INFORMATION OUTPUT METHOD, AND COMPUTER-READABLE MEDIUM STORING FACILITY INFORMATION OUTPUT PROGRAM

This application claims the benefit of Japanese Patent Application No. 2310380 filed on Nov. 30, 2007, the entire disclosure of which is incorporated herein by reference.

BACKGROUND

The disclosure relates to a facility information output device, a facility information output method, and a computer-readable medium storing a facility information output program to search for a facility that is a desired destination according to a user' input, by using, as a search condition, a neighboring facility of the facility that is the desired destination.

Various types of known devices have been proposed to search for and output facility information on a facility that is a desired destination. For example, Japanese Patent Application Publication No. JP-A-2194817 describes a navigation device that performs a focused search using a facility genre and a region name as search conditions.

It is difficult for the navigation device that is described in Japanese Patent Application Publication No. JP-A-2194817 to focus its search for the facility that is the destination if the name of the region in which the facility exists is not known.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION OF EMBODIMENTS

A navigation device in accordance with embodiments of the present invention will be explained in detail below with reference to the drawings. The navigation device in some embodiments is installed in a vehicle. Other arrangements are, however, not excluded. For example, the navigation device in some embodiments is a portable device arranged for use by a pedestrian or hiker or rider etc.

In addition, the functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory (RAM), a read only memory (ROM), a programmable memory, a hard disk, a compact disc, or another form of storage medium readable, directly or indirectly, by a processing device. In at least some embodiments, one or more hardware components may comprise virtual hardware components in place of physical hardware components.

In this disclosure, "facility" means any point of interest that can be identified on a map. Examples of "facility" include, but are not limited to, shops, stores, department stores, monuments, intersections, post offices, parks, buildings, landmarks, entertainment centers, residencies etc.

First, the overall configuration of the navigation device will be explained based on FIG. 1 which is a block diagram of the navigation device.

Figure 1:
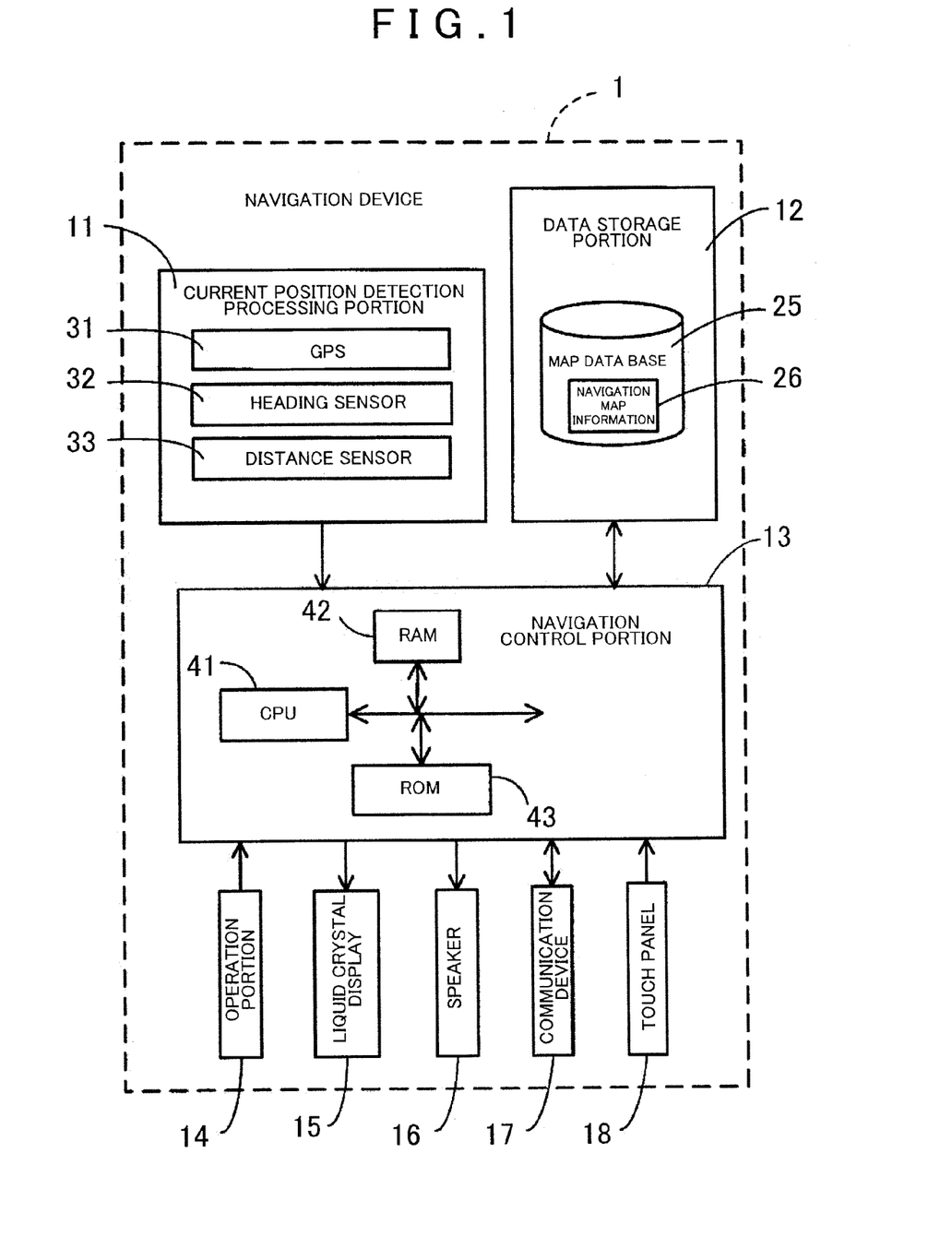
FIG. 1 is a block diagram of a navigation device in accordance with an embodiment.

As shown in FIG. 1, a navigation device 1 comprises a current position detection processing portion 11 that detects a current position of the navigation device (i.e., the current position of the vehicle), a data storage portion 12 that stores various types of data, a navigation control portion 13 that performs various types of computational processing based on input information, an operation portion 14 that accepts a command from a user, a liquid crystal display 15 that displays visible information such as a map and the like for the user, a speaker 16 that outputs audible information, such as voice route guidance and the like, a communication device 17 that communicates with a road traffic information center or a map information distribution center (not shown in the drawing), and a touch panel 18 that is provided on the screen of the liquid crystal display 15. Other arrangements are, however, not excluded. For example, in some embodiments, the liquid crystal display is replaced with an LED or OLED display, or the touch panel 18 is omitted, or the operation portion 14 is incorporated in the touch panel 18.

The current position detection processing portion 11 includes a GPS unit 31, a heading sensor 32, a distance sensor 33, an altimeter (not shown in the drawing), and the like, and is capable of detecting the vehicle's current position, its heading, the distance to a target (for example, an intersection), and the like.

The GPS 31 detects the current position of the vehicle on the Earth, as well as the current time, by receiving radio waves that are generated by artificial GPS satellites. The heading sensor 32 detects the heading of the vehicle and includes any sensor that is attached to a rotating part of the steering wheel (not shown in the drawing) such as a geomagnetic sensor, a gyroscopic sensor, or an optical rotation sensor, and/or any sensor that is attached to a wheel (not shown), such as a rotational resistance sensor or an angle sensor, or the like. The distance sensor 33 detects the distance that the vehicle has traveled and includes a sensor that measures a revolution speed of a wheel of the vehicle (not shown in the drawing) and detects the distance based on the measured revolution speed, and/or a sensor that detects the distance by measuring acceleration and integrating the measured acceleration twice, or the like, for example.

The data storage portion 12 stores a map database 25, a specified program, and the like.

The map database 25 stores various types of map data that are necessary for route guidance, traffic information guidance, and map displays. Road information is also stored in the map database 25. The road information includes node data items and link data items. The node data items are data items that indicate geographical points (i.e., nodes) on roads and include coordinates as position information items for the geographical points. The link data items are data items that indicate roads that connect the geographical points that are indicated by the node data items. Each of the link data items includes data such as a pair of the node data items that indicate the nodes at the two ends of the link, a link length, a road width, a road type for the link, and the like. Each of the link data items also includes data such as a travel restriction for the link (one-way travel, a time slot restriction), the road name, and the like, so the road can be specified by the link data item. Further, the node data items and the link data items are each respectively assigned a node ID and a link ID.

A search database 51 that is used in search processing that will be described later is also stored in the map database 25. The search database 51 will be described in detail later.

The contents of the map database 25 are updated based on update information that is distributed through the communication device 17 from the map information distribution center that is not shown in the drawing.

The navigation control portion 13 includes a CPU 41, a RAM 42, a ROM 43, and the like. The CPU 41 functions as a computational device and a control device that performs overall control of the navigation device 1. The RAM 42 is used as a working memory for various types of computational processing that the CPU 41 performs. The ROM 43 stores a control program, as well as a program for facility information output processing that will be described later. Other types of computer-readable media, such as hard disks, flashcard, etc. are, however, not excluded.

Each of the operation portion 14, the liquid crystal display 15, the speaker 16, the communication device 17, and the touch panel 18, which are peripheral devices (actuators), is electrically connected to the navigation control portion 13.

The operation portion 14 is configured from various types of keys and a plurality of operation switches. The operation portion 14 is operated to correct the current position when travel starts, to input a departure point as a guidance start point, to input a destination as a guidance end point, to perform a search for information related to a facility, and the like. The navigation control portion 13 performs control such that various types of operations are executed based on switch signals that are generated by the user's pressing the various switches on the operation portion 14.

The liquid crystal display 15 displays map information for the location where the vehicle is currently traveling, operation guidance, an operation menu, key guidance, a recommended route from the current position to the destination, guidance information along the recommended route, traffic information, news, a weather forecast, time, e-mails, television programs, and the like.

The speaker 16 outputs voice guidance and the like, that guides travel along the recommended route, based on commands from the navigation control portion 13.

The communication device 17 is a communication unit that communicates with the map information distribution center through a mobile telephone network or the like. The communication device 17 transmits and receives the latest version of the map update information and the like to and from the map information distribution center. In addition to its communication with the map information distribution center, the communication device 17 also receives various types of traffic information, such as congestion information, a congestion level at a service area, and the like, that is transmitted from the road traffic information center or the like.

The touch panel 18 is a touch switch in the form of a transparent panel that is provided on the screen of the liquid crystal display 15. The touch panel 18 is configured such that various types of commands can be input by pressing a button or a map that is displayed on the liquid crystal display 15.

Note that the configuration of the navigation device 1 described above is merely one example, and the disclosed embodiments are not limited to this configuration.

Facility Information Output Processing

Next, the facility information output processing that is executed in accordance with an embodiment of the present invention will be explained with reference to FIG. 2 which is a flowchart of the facility information output processing. The facility information output processing is started based on a specified command received by the operation portion 14. Note that the term "neighboring facility" is used herein not only to refer to a facility that is immediately adjacent to a desired facility, but also to a facility that is positioned such that it is separated from the desired facility by no more than a specified number of facilities, or that it is within a predetermined distance from the first facility, or that is has a specified spatial or geographical relationship with the first facility.

Figure 3:
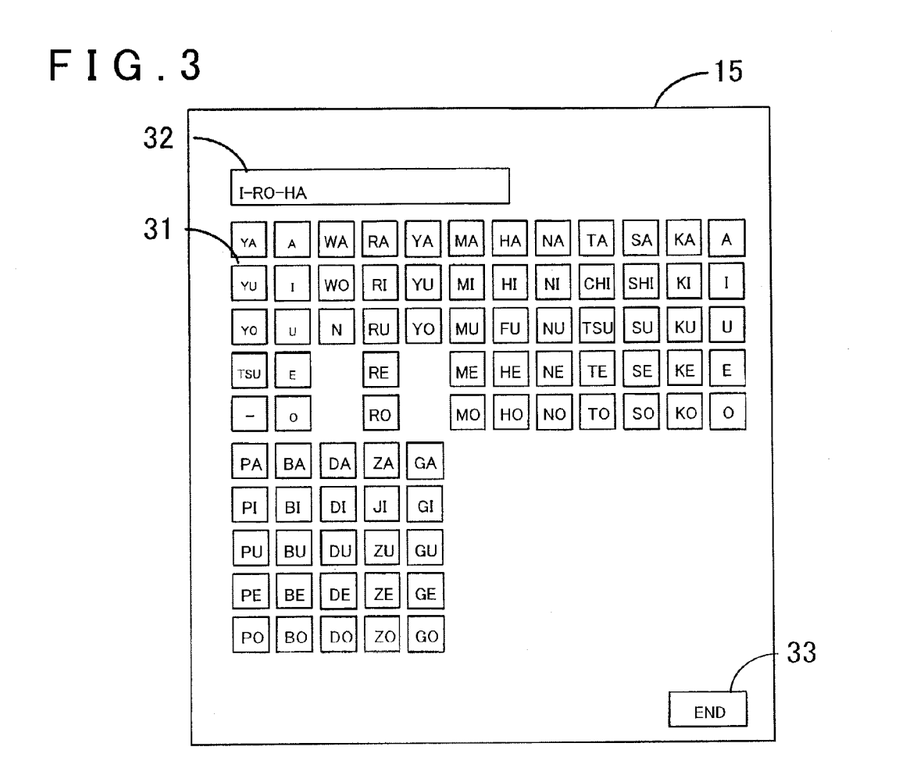
FIG. 3 is an exemplary input screen in accordance with an embodiment.

First, at S1, an input screen is displayed on the liquid crystal display 15. FIG. 3 is an exemplary input screen that is displayed at S1. Character input buttons 31, a character display portion 32, and an End button 33 are displayed on the input screen. The character input buttons 31 are used to input hiragana characters that represent the fifty syllables of the Japanese language. The character display portion 32 displays the hiragana characters that are input using the character input buttons 31. The End button 33 is used to terminate the character input. Other arrangements are, however, not excluded. For example, the character input buttons 31 in some embodiments are configured to input characters of the English alphabet.

After the input screen is displayed at S1, the processing proceeds to S2. At S2, the character input buttons 31 and the End button 33 are enabled, and the user inputs the name of a desired facility (hereinafter called the "first facility") using the character input buttons 31. It is acceptable to input only a portion of the first facility's name. The processing proceeds to S3 when the End button 33 is pressed. Other arrangements are, however, not excluded. For example, instead of facility name, the user in some embodiments can search for any facility information, e.g., ownership, category (e.g., grocery, coffee shop etc.) etc.

At S3, a search processing is performed based on the character string that was input at S2. The search processing uses the search database 51, which will be described later, to search for a facility ID of a facility name that matches the character string (or keyword or search query) that was input at S2. The processing then proceeds to S4.

Figure 4:
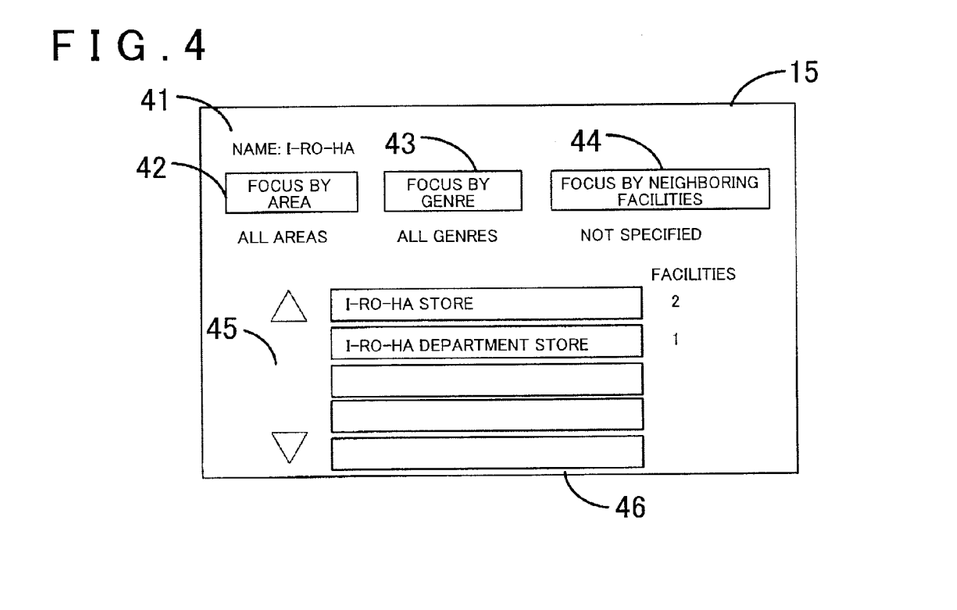
FIG. 4 is an exemplary search result screen in accordance with an embodiment.

At S4, a search result screen is displayed on the liquid crystal display 15. On the search result screen, a facility name or the like is displayed for the facility ID that was identified at S3. FIG. 4 is an exemplary search result screen that is displayed at S4. The search result screen includes a name display portion 41, an area focus button 42, a genre focus button 43, a neighboring facility focus button 44, scroll buttons 45, and a search result display portion 46.

The name display portion 41 displays the character string that was input at S2. The area focus button 42 if pressed sets a specific area as a condition for a refined search. The genre focus button 43 if pressed sets a specific genre as a condition for a refined search. The neighboring facility focus button 44 if pressed sets a specific neighboring facility as a condition for a refined search.

The search results can be scrolled through by pressing the scroll buttons 45. The search results are displayed in the search result display portion 46. When the search results are displayed, the number of facilities that were found for each of the facility names that were found are displayed adjacent, e.g., to the right of, the facility names. If the neighboring facility focus button 44 is pressed on the screen shown in FIG. 4 (S5), the processing proceeds to S6.

Figure 5:
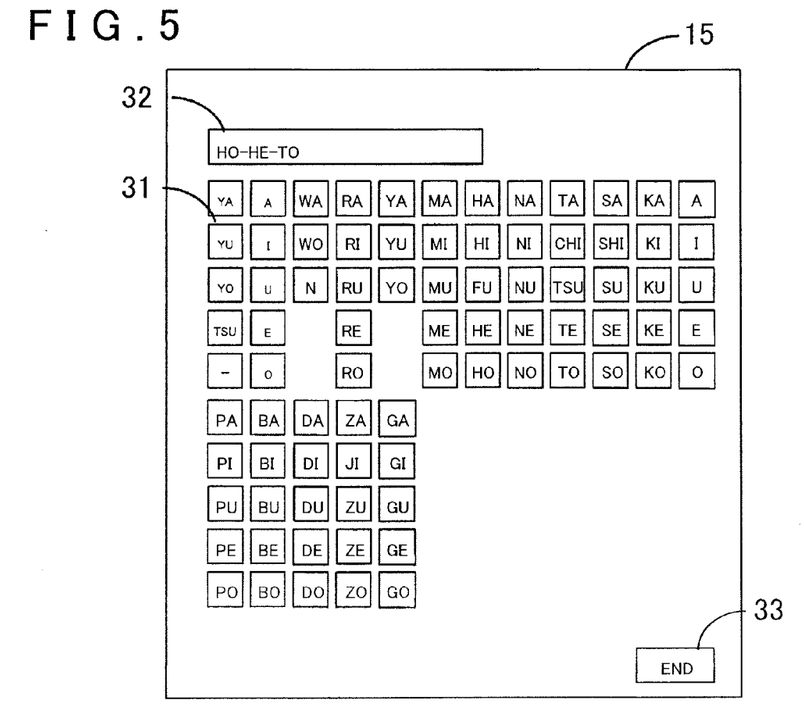
FIG. 5 is an exemplary input screen in accordance with an embodiment.

At S6, an input screen is displayed in the same manner as at S1 (refer to FIG. 5). The processing then proceeds to S7 for accepting input from the user. At S7, the user inputs the name of a facility (hereinafter called the "second facility") that has a neighboring relationship with the desired facility. At this point, the user's pressing the End button 33 causes the processing to proceed to S8.

At S8, a search is performed using the character string that was input at S7, the character string that was input at S2, and the search database 51. The search processing that is executed at S8 will be described in detail later.

Figure 6:
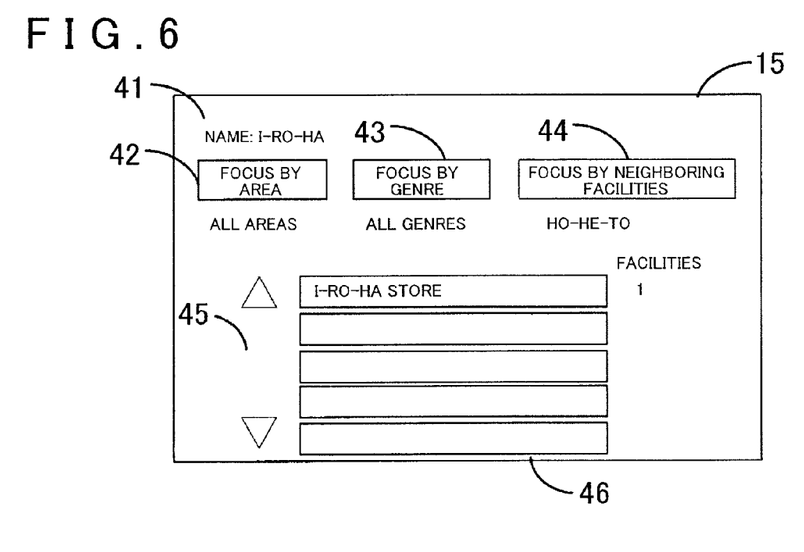
FIG. 6 is an exemplary search result screen in accordance with an embodiment.

At S9, a search result screen is displayed on the liquid crystal display 15 (refer to FIG. 6). The user can select a desired second facility name from among the facility names that are displayed on the search result screen, then set the selected second facility as a destination or display a map with the selected second facility in the center.

Note that in the flowchart described above, the search processing is executed two times, but the facility information output processing may also be configured such that the facility name of the first facility and the facility name of the second facility are both input on the same screen and the search processing is executed once.

Search Processing

First Method

Figure 2:
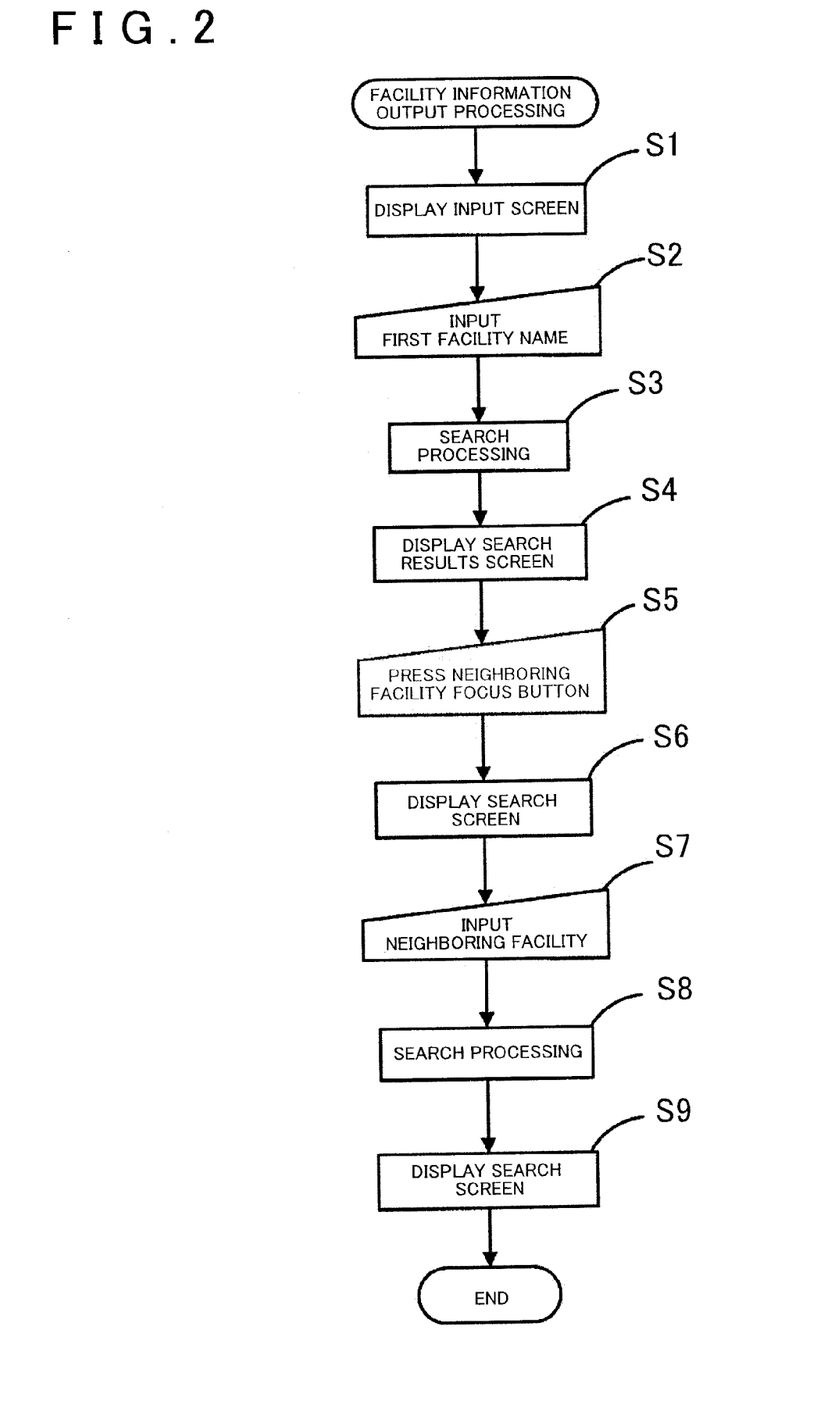
FIG. 2 is a flowchart of facility information output processing in accordance with an embodiment.
Figure 7:
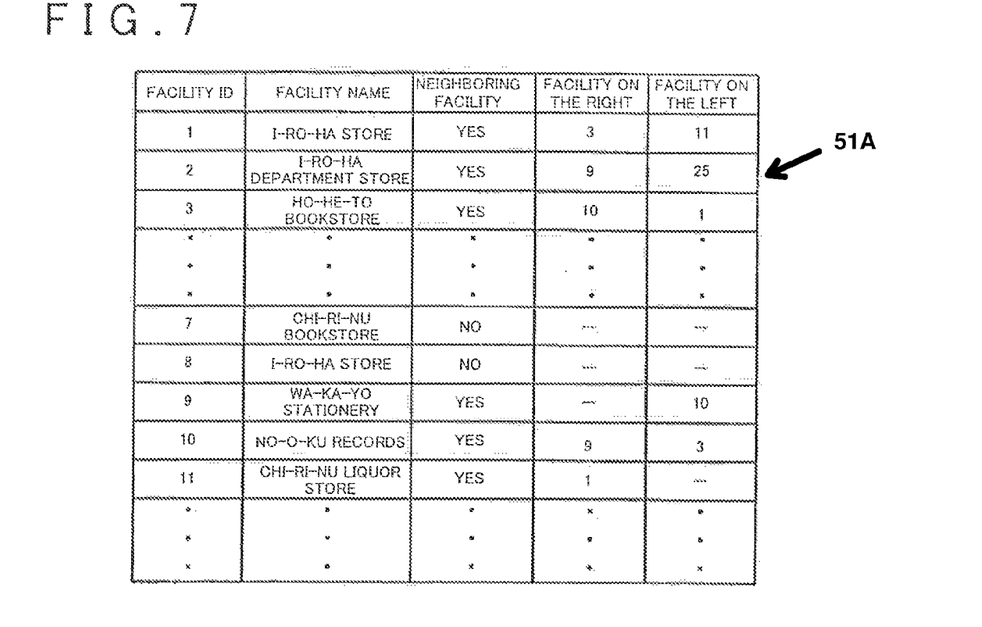
FIG. 7 is a diagram that shows a structure of a search database in accordance with an embodiment.

The search processing that is executed at S3 and S8 in FIG. 2 will be now explained in detail. A search database 51A that is shown in FIG. 7 is used in the search processing. The search database 51A is an embodiment of the search database 51 described above. For each facility, the search database 51A includes a facility ID as a key, as well as associated attributes such as "facility name," "neighboring facility," "facility on the right," and "facility on the left." The "facility name" attribute indicates the facility name of the facility of interest. The "neighboring facility" attribute indicates whether or not a neighboring facility exists. If a neighboring facility exists, the attribute value is "Yes", and if no neighboring facilities exist, the attribute value is "No". The "facility on the right" attribute has, as its attribute value, the facility ID of the neighboring facility, if any, on the right side of the facility of interest. The "facility on the left" attribute has, as its attribute value, the facility ID of the neighboring facility, if any, on the left side of the facility of interest.

The search processing that uses the search database 51A that is shown in FIG. 7 will be explained using a specific example in which I-ro-ha Store (the first facility) is next to Ho-he-to Bookstore (the second facility) which is the facility that is set as the destination.

At S2, the user inputs "i-ro-ha" (FIG. 3). The search processing refers to the search database 51A and identifies the facility IDs 1, 2, and 8, for which "i-ro-ha" is the attribute value of the associated facility name attribute (S3).

Thus, at S4, the search result screen that is displayed on the liquid crystal display 15 shows that two facilities called "I-ro-ha Store" and one facility called "I-ro-ha Department Store" were found (refer to FIG. 4).

At this point, if the neighboring facility focus button 44 is pressed, a determination is made as to whether or not a neighboring facility exists for each of the facility IDs that were identified at S3 (in this example, the facility IDs 1, 2, and 8). The determination as to whether or not a neighboring facility exists can be made by referring to the neighboring facility attribute in the search database 51A. In this case, among the facility IDs 1, 2, and 8, the facility IDs 1 and 2 each have a neighboring facility attribute with an attribute value of "Yes", so it is determined that one or more the neighboring facilities exist for the "I-ro-ha Store" with the facility ID 1 and the "I-ro-ha Department Store" with the facility ID 2. The facility IDs for which it is determined that the neighboring facilities exist are stored in the RAM 42 in association with the facility IDs of any neighboring facilities on the right side and the left side of the stored facility IDs.

In this example, the facility ID 3 and the facility ID 11 are stored as the neighboring facilities in association with the facility ID 1, and the facility ID 9 and the facility ID 25 are stored as the neighboring facilities in association with the facility ID 2.

Then, at S7, "ho-he-to" is input as the second facility or desired destination (FIG. 5). Next, at S8, a determination is made as to whether or not "ho-he-to" is included in an attribute value of the "facility name" attribute of one of the facility IDs (i.e., facility IDs 3, 11, 9, 25) that are stored as the neighboring facilities in the RAM 42. In this case, "ho-he-to" is included in the attribute value ("Ho-he-to Bookstore") of the "facility name" attribute of the facility ID 3 of the facility on the right side of the facility ID 1 (FIG. 9), so the facility ID 1 is identified as a search result.

Next, the facility information (e.g., the facility name) for the facility ID 1 is displayed as the search result (FIG. 6). At this point, if the position where "I-ro-ha Store" is displayed is pressed, a map that has the "I-ro-ha Store" at its center, a recommended route from the current position to the "I-ro-ha Store", and the like are displayed.

In the processing that is described above, only the neighboring facilities immediately on the left and right of the first facility are identified, but it is also possible, for example, to search for two or more neighboring facilities on each of the left and right sides of the first facility. This processing will be explained in the following section for two neighboring facilities on each side of the first facility, e.g., the "I-ro-ha Store" with the facility ID 1. First, the facility IDs of the facilities on the left and right of the "I-ro-ha Store" are specified by referring to the "facility on the right" attribute value and the "facility on the left" attribute value for the facility ID 1. In this example (FIG. 7), the facility ID 3 ("Ho-he-to Bookstore") and the facility ID 11 ("Chi-ri-nu Liquor Store") are specified as the facilities on the right and left, respectively. Next, the processing determines that the attribute value of the "neighboring facility" attribute for the facility ID 3 is "Yes" and identifies the attribute value of the "facility on the right" attribute for the facility ID 3 as the facility ID 10 ("No-o-ku Records"). This makes it possible to specify that the "Ho-he-to Bookstore" (facility ID 3) is on the right side of the "I-ro-ha Store" (facility ID 1) and that the next store to the right is "No-o-ku Records" (facility ID 10).

It is also possible to specify in the same manner that the "Chi-ri-nu Liquor Store" (facility ID 11) is on the left side of the "I-ro-ha Store" (facility ID 1) and that no other facility exists on the left of the "Chi-ri-nu Liquor Store" (facility ID 11) and the "I-ro-ha Store" (facility ID 1). It is thus possible to narrow down the search results for the character string that is input as the first facility by determining whether or not the character string that is input as the second facility is included in the attribute value of the "facility name" attribute of the neighboring facility or facilities of the first facility.

Note that this processing is applicable to search for three or more neighboring facilities on each side of the first facility. Moreover, the processing can be configured such that the user can select the range (number) of neighboring facilities to be searched. The search database 51A can also be configured such that each facility ID is associated with two or more facility IDs on each of the left and right sides. According to the search database 51A that is shown in FIG. 7, the facility IDs of the neighboring facilities are stored in advance, so that the processing can be focused on the search for neighboring facilities and can be executed at higher speed.

Second Method

Figure 8:
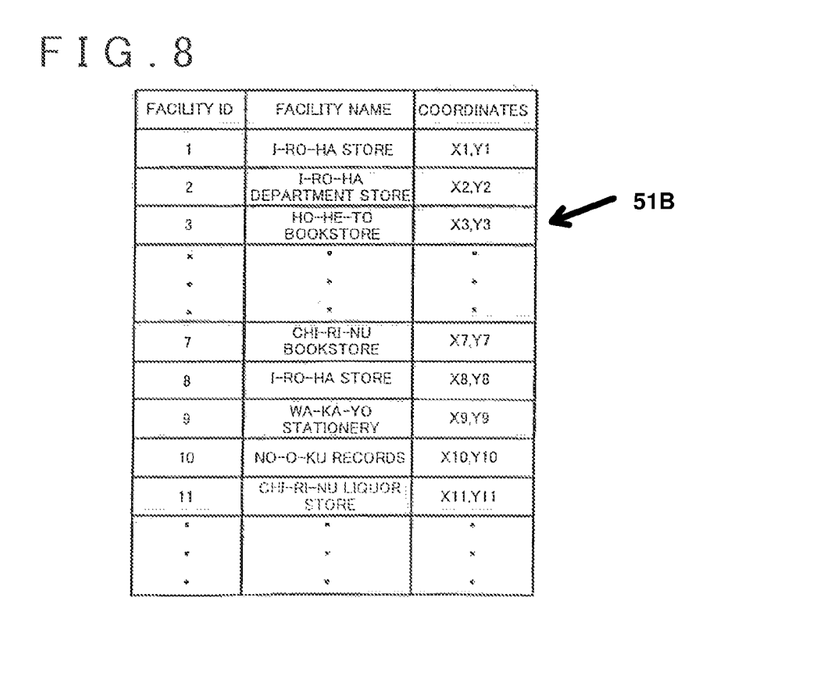
FIG. 8 is a diagram that shows a structure of a search database in accordance with an embodiment.

The search processing that is executed at S3 and S8 in FIG. 2 can also be implemented by using a search database 51B that is shown in FIG. 8. The search database 51B is a further embodiment of the search database 51 described above. For each facility, the database 51B has a facility ID as a key, as well as associated attributes, such as a facility name and coordinates. The "facility name" attribute indicates the facility name of the facility. The "coordinates" attribute indicates position information for the facility. Note that the search database 51B that is shown in FIG. 8 may also utilize the various types of map data that are stored in the map database 25.

First, the coordinates of the first facility are acquired. Next, the facility IDs of the facilities that exist within a specified range from the acquired coordinates (hereinafter called the "neighboring facility candidates") are identified in the search database 51B. The identified facility IDs for the neighboring facility candidates are stored temporarily in the RAM 42.

Next, the nodes that exist within a specified range from the coordinates of the first facility are identified. The road information described above is referenced in identifying the nodes. Next, the link data items that include the identified nodes are specified. This makes it possible to specify the roads that exist in the vicinity of the first facility (hereinafter called the "neighboring road candidates").

Next, the roads that provide access to the first facility (hereinafter called the "neighboring roads") are specified from among the specified neighboring road candidates, based on their distances from the first facility.

Next, the facilities that can be accessed by the neighboring roads are specified based on the distances between each of the neighboring facility candidates and the neighboring roads. The facilities that have a neighboring relationship with the first facility are also specified as neighboring facilities based on their distances from the first facility.

Figure 9:
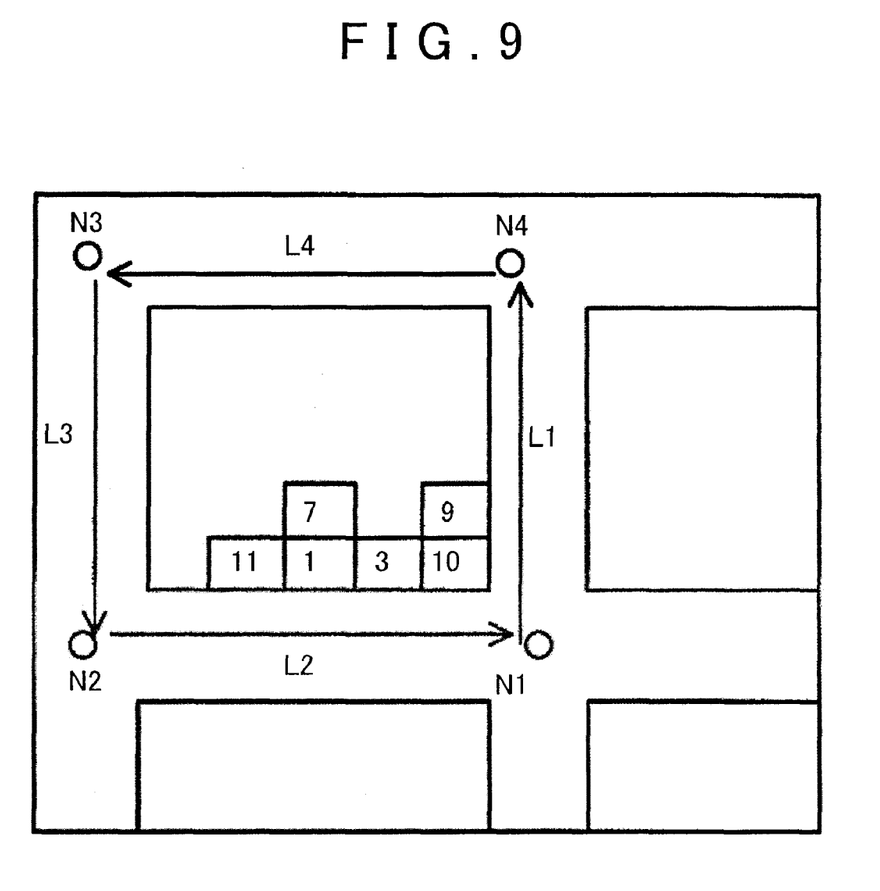
FIG. 9 is a diagram that shows positional relationships among facilities, nodes, and roads in accordance with an embodiment.

The processing will be explained using FIG. 9. FIG. 9 is an example that shows positional relationships among the facilities, the nodes, and the roads. In the example shown in FIG. 9, when the facility with the facility ID 1 is input as the first facility, the facilities that exist within a specified range from the facility with the facility ID 1 are identified as the neighboring facility candidates based on the coordinates of the facility ID 1. In this example, the facilities with the facility ID 3, facility ID 7, facility ID 9, facility ID 10, and facility ID 11 are identified as the neighboring facility candidates.

Next, the nodes that exist within a specified range from the facility with the facility ID 1 are identified. In this example, the nodes N1, N2, N3, and N4 are identified.

Next, the link data items that have node data item pairs that include any one of the nodes N1, N2, N3, and N4 are specified. In this example, the road L1, the road L2, the road L3, and the road L4 are specified as the neighboring road candidates.

Next, the roads that exist within a specified range from the facility with the facility ID 1 are specified as the neighboring roads based on the distances between the coordinates of the facility ID 1 and each of the neighboring road candidates. In this example, only the road L2 is located within the specified distance from the facility with the facility ID 1, so only the road L2 is specified as the neighboring road.

Next, the facilities with the facility ID 3, facility ID 10, and facility ID 11 are specified as the facilities that can be accessed by the neighboring road L2, based on the distances between the neighboring road L2 and each of the neighboring facility candidates (i.e., the facilities with the facility ID 3, facility ID 7, facility ID 9, facility ID 10, and facility ID 11). Next, based on the distances between the first facility and each of the specified facilities (i.e., facilities that can be accessed by neighboring road L2), the facility with the facility ID 3 and the facility with the facility ID 11, each of which has a neighboring relationship with the first facility, are specified as the neighboring facilities.

Another example when the facility with the facility ID 10, which is located at a corner of roads L1, L2, is input as the first facility will be explained below using FIG. 9.

First, based on the coordinates of the facility ID 10, the facilities that exist within a specified range from the facility with the facility ID 10 are identified as the neighboring facility candidates. In this example, the facilities with the facility ID 1, facility ID 3, facility ID 7, facility ID 9, and facility ID 11 are identified as the neighboring facility candidates.

Next, the nodes that exist within a specified range from the facility with the facility ID 10 are identified. In this example, the nodes N1, N2, N3, and N4 are identified.

Next, the link data items that have node data item pairs that include any one of the nodes N1, N2, N3, and N4 are specified. In this example, the road L1, the road L2, the road L3, and the road L4 are specified as the neighboring road candidates.

Next, the roads that exist within a specified range from the facility with the facility ID 10 are specified as the neighboring roads based on the distances between the coordinates of the facility ID 10 and each of the neighboring road candidates. In this example, the road L1 and the road L2 are located within the specified distance from the facility with the facility ID 10, so the road L1 and the road L2 are specified as the neighboring roads.

Next, the facility with the facility ID 9 is specified as the facility that can be accessed by the neighboring road L1, based on the distances between the neighboring road L1 and each of the neighboring facility candidates (i.e., the facilities with the facility ID 1, facility ID 3, facility ID 7, facility ID 9, and facility ID 11).

In addition, the facilities with the facility ID 1, facility ID 3, and facility ID 11 are specified as the facilities that can be accessed by the neighboring road L2, based on the distances between the neighboring road L2 and each of the neighboring facility candidates.

Next, based on the distances between the first facility (facility ID 10) and each of the specified facilities (i.e., the facilities that can be accessed by the neighboring road L1 or L2), the facilities with the facility ID 3 and facility ID 9, each of which has a neighboring relationship with the first facility, are specified as the neighboring facilities.

Note that in one or more of the embodiments described above, the information search processing is carried out by the CPU 41 within the vehicle. However, in other embodiments information about the first facility and the second facility that are input is transmitted to a remote information center that is not shown in the drawings, with the processing being executed at the information center, the processing results being received by the navigation device 1, and the received search results being displayed by the navigation device 1.

Note that in one or more of the above disclosed embodiments, the neighboring facilities are described as being on the right and on the left of the first facility, but they may also be described in terms of relative directions or the like. For example, in some embodiments "the neighboring facility to the south", "the neighboring facility to the east", and the like are used.

In some embodiments, the specified range for identifying the neighboring facility candidates is set to be smaller than the specified range used by the second method, and then the facilities that are within the set specified range are specified as neighboring facilities, based on the coordinates of the first facility, without specifying the neighboring roads at all.

In some embodiments, a facility information output device, a facility information output method, and a facility information output program are provided to search for a facility that is a desired destination according to the user's input, by using, as a search condition, a neighboring facility of the facility that is the desired destination.

According to a first aspect, it is possible to input, as a search condition, a facility name of a neighboring facility of a facility that is the destination, so that the user can easily search for the desired facility.

According to a second aspect, it is determined whether or not a neighboring relationship exists between a first facility and a second facility. The user can therefore easily search for the desired facility by using the result of the determination.

According to a third aspect, facility information for each of the facilities that has a neighboring relationship with a desired facility is associated with the desired facility in the facility information. The user can therefore easily search for the desired facility by referring to the associated information.

According to a fourth aspect, the facility information for each of the facilities includes location information, so that the user can easily search for the desired facility by referring to the location information.

According to a fifth aspect, it is possible to input, as a search condition, the facility name of a neighboring facility of the facility that is the destination, so that the user can easily search for the desired facility.

It should be understood by those skilled in the art that the present invention is not limited by the examples described above and that various improvements and modifications may occur insofar as they are within the scope of the present invention. For example, the present invention may also be used in a mobile telephone, an information communication terminal, a personal computer, a guide terminal and the like.

The invention claimed is:

1. A facility information output device, comprising:
a data storage medium storing therein a database that contains, for each of a plurality of facilities, facility information including
a facility ID of the facility,
a facility name attribute that indicates a facility name of the facility,
a neighboring facility attribute that indicates whether or not a neighboring facility adjacent to the facility exists,
a facility on the right attribute that has an attribute value being the facility ID of a neighboring facility on the right side of the facility, and
a facility on the left attribute that has an attribute value being the facility ID of a neighboring facility on the left side of the facility;
an input unit for receiving first and second search queries; and
a processor connected to the data storage medium and the input unit and configured for, on the basis of the facility information contained in the database, identifying facility IDs corresponding to the facility name attributes that satisfy the first query,
determining, on the basis of the neighboring facility attributes contained in the database, whether or not a neighboring facility exists for each of the identified facility IDs,
determining, for each of the identified facility IDs for which it has been determined that a neighboring facility exists, whether or not the facility name attribute of the neighboring facility on the right side or on the left side of the facility corresponding to said identified facility ID satisfies the second query, and
outputting the facility information for the identified facility ID for which it has been determined that the facility name attribute of the neighboring facility on the right side or on the left side of the corresponding facility satisfies the second query.

2. The facility information output device according to claim 1, wherein
the processor is configured to
in response to said first query, return a list of candidate facilities that have the facility name attributes satisfying the first query;
output said list of the candidate facilities;
the input unit is configured to, in response to user interaction with the outputted list, enable receipt of the second query; and
the processor is further configured to, in response to said second query, perform a refined search to output a list of only those candidate facilities which have the neighboring facility on the right side or on the left side with the facility name attribute satisfying the second query.

3. A facility information output method using a database that contains, for each of a plurality of facilities, facility information including
a facility ID of the facility,
a facility name attribute that indicates a facility name of the facility,
a neighboring facility attribute that indicates whether or not a neighboring facility adjacent to the facility exists,
a facility on the right attribute that has an attribute value being the facility ID of a neighboring facility on the right side of the facility, and
a facility on the left attribute that has an attribute value being the facility ID of a neighboring facility on the left side of the facility;
said method comprising, in response to first and second search queries:
identifying, on the basis of the facility information contained in the database, facility IDs corresponding to the facility name attributes that satisfy the first query,
determining, on the basis of the neighboring facility attributes contained in the database, whether or not a neighboring facility exists for each of the identified facility IDs,
determining, for each of the identified facility IDs for which it has been determined that a neighboring facility exists, whether or not the facility name attribute of the neighboring facility on the right side or on the left side of the facility corresponding to said identified facility ID satisfies the second query, and
outputting the facility information for the identified facility ID for which it has been determined that the facility name attribute of the neighboring facility on the right side or on the left side of the corresponding facility satisfies the second query.

4. The method according to claim 3, further comprising:
in response to said first query, returning a list of candidate facilities that have the facility name attributes satisfying the first query;
outputting said list of the candidate facilities;
in response to user interaction with the outputted list, receiving the second query; and
in response to said second query, performing a refined search to output a list of only those candidate facilities which have the neighboring facility on the right side or on the left side with the facility name attribute satisfying the second query.

5. A computer-readable medium containing a facility information output program that, when executed by a computer, causes the computer to perform a facility information output method using a database that contains, for each of a plurality of facilities, facility information including
a facility ID of the facility,
a facility name attribute that indicates a facility name of the facility,
a neighboring facility attribute that indicates whether or not a neighboring facility adjacent to the facility exists,
a facility on the right attribute that has an attribute value being the facility ID of a neighboring facility on the right side of the facility, and
a facility on the left attribute that has an attribute value being the facility ID of a neighboring facility on the left side of the facility;
said method comprising, in response to first and second search queries:
identifying, on the basis of the facility information contained in the database, facility IDs corresponding to the facility name attributes that satisfy the first query,
determining, on the basis of the neighboring facility attributes contained in the database, whether or not a neighboring facility exists for each of the identified facility IDs,
determining, for each of the identified facility IDs for which it has been determined that a neighboring facility exists, whether or not the facility name attribute of the neighboring facility on the right side or on the left side of the facility corresponding to said identified facility ID satisfies the second query, and
outputting the facility information for the identified facility ID for which it has been determined that the facility name attribute of the neighboring facility on the right side or on the left side of the corresponding facility satisfies the second query.

6. The computer-readable medium according to claim 5, wherein said method further comprises:
in response to said first query, returning a list of candidate facilities that have the facility name attributes satisfying the first query;
outputting said list of the candidate facilities;
in response to user interaction with the outputted list, receiving the second query; and
in response to said second query, performing a refined search to output a list of only those candidate facilities which have the neighboring facility on the right side or on the left side with the facility name attribute satisfying the second query.

7. A facility information output method using a database that contains, for each of a plurality of facilities, facility information including:
a facility ID of the facility,
a facility name attribute that indicates a facility name of the facility,
a neighboring facility attribute that indicates whether or not a neighboring facility adjacent to the facility exists, and
two or more attribute value fields at least one of which includes the facility ID of a neighboring facility of the facility when the neighboring facility attribute indicates that a neighboring facility adjacent to the facility exists;
said method comprising, in response to different first and second search queries:
identifying, on the basis of the facility information contained in the database, facility IDs corresponding to the facility name attributes that satisfy the first query,
determining, on the basis of the neighboring facility attributes contained in the database, whether or not a neighboring facility exists for each of the identified facility IDs,
determining, for each of the identified facility IDs for which it has been determined that a neighboring facility exists, whether or not the facility name attribute of the neighboring facility corresponding to said identified facility ID satisfies the second query, and
outputting the facility information for the identified facility ID for which it has been determined that the facility name attribute of the neighboring facility of the corresponding facility satisfies the second query.

* * * * *